# 3,043,129
LEAK DETECTOR
Cecil V. King, Chatham, N.J., assignor to N.V. Beleggingsmaatschappij "Margarita," Curacao, Netherlands Antilles, a corporation of Curacao
Filed Feb. 12, 1960, Ser. No. 8,404
22 Claims. (Cl. 73—40)

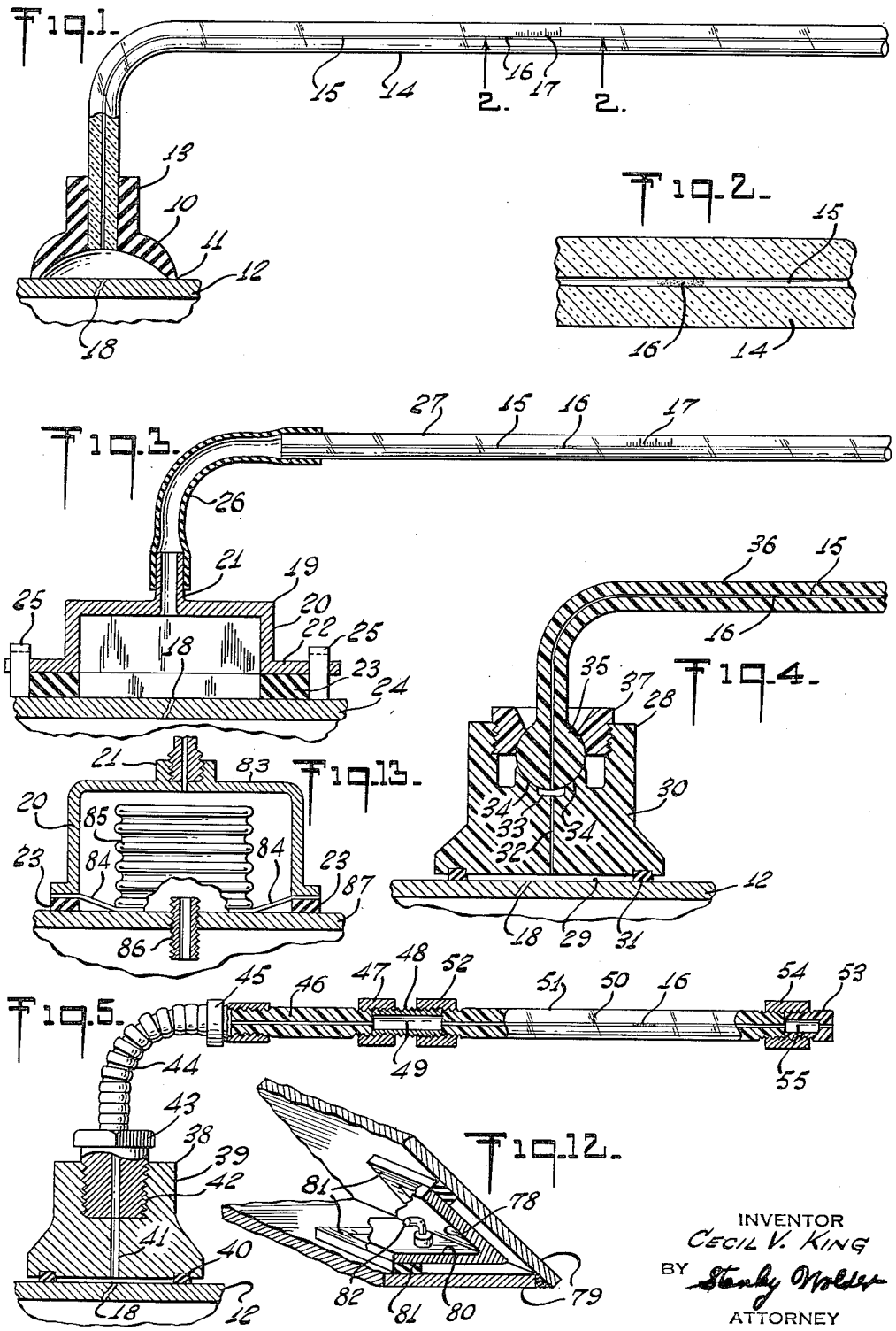

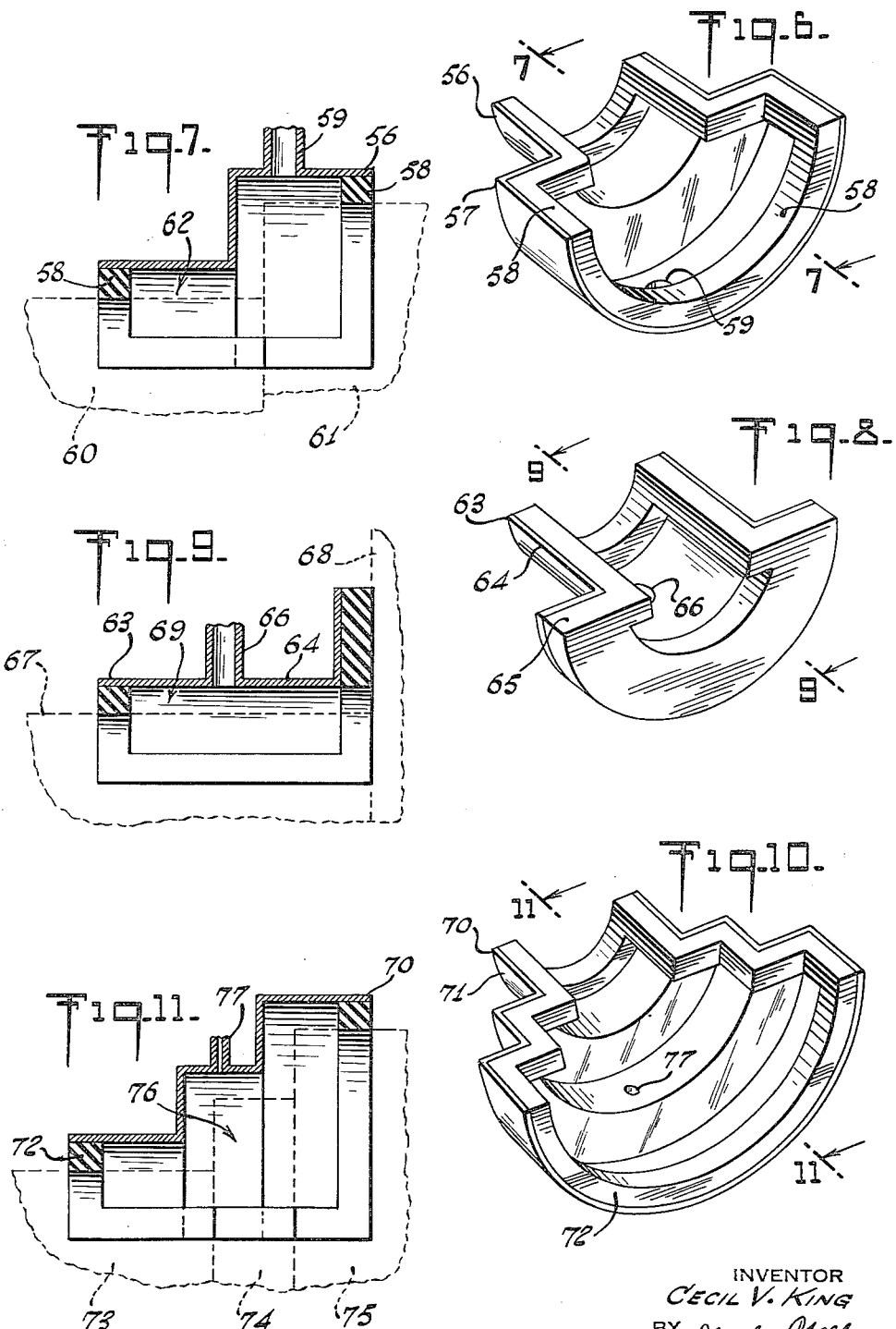

The present invention relates to leak detectors and especially a leak detector of universal application particularly to detect both large and small leaks in both pressure and vacuum systems.

Methods of detecting leaks in piping, storage containers, reactors and other vessels and conduits are legion. However, few if any are of universal application. Many are quite complex, most are ineffective when it comes to detecting leaks in vacuum sysems, and very few provide highly sensitive means of detecting small leaks in vacuum systems. Particularly in the case of the last mentioned, great problems are encountered since apparently only extremely complex methods have been found effective in the past.

The problem of vacuum leak detection is made very difficult since the leak introduces atmospheric air into the system and unless the analysis then is made of the internal atmosphere of the system the leak is almost impossible to detect if small. One of the methods for vacuum leak detection heretofore employed consists of selectively spraying portions of a vacuum system suspected of having leaks with a gas probe, generally helium, and then analyzing the atmosphere in the system by means of a mass spectograph. Obviously, this is a complicated procedure requiring expensive instrumentation.

Other practical methods employed in detecting vacuum leakages consist of bringing near to a suspected surface a flame. Should the flame show distortion or be sucked into the system this would indicate a leak in the immediate neighborhood of such action. However, this method is a gross approach and may be employed only in cases of leakages of substantial magnitude.

Because of the difficulty of applying the various methods of vacuum leak detection it has been customary procedure to close down a vacuum system suffering from leakage, pressurize it and then test for the leak by way of detection of the escaping gas employed to pressurize the system. One of the principal drawbacks of this maneuver is that sometimes leaks into a vacuum system become plugged when the pressure is reversed.

Another attempt to overcome the problem is to employ a leak detecting fluid in the system but this approach suffers from the fact that the fluid may come in contact with metal or other parts which are corroded thereby or with electrical insulating materials the resistance of which may be decreased by reason of contact with liquids.

In detecting leaks in pressure systems, in some cases the simple approach of a viscous liquid or foam over the areas to be detected is sufficient since the bubbling caused by the passage of leaking gas through the liquid or foam will present a ready visual indication of the leak. However, such systems do not readily detect slow leaks and cannot be used on hot or really cold surfaces since they tend to boil off hot surfaces and freeze on the cold surfaces.

In addition to all of the above, it is usually desirable that the leakage detector system not cause contamination of the system being checked. In cases of vacuum system leak detection, particularly, this consideration rules out most of the simple expedients heretofore available.

It is a primary object of the present invention to provide a universal leak detector of simple construction and operation which, nevertheless, will readily detect leaks of small magnitude.

Another object of the present invention is to provide such a leak detector which may readily be applied to all kinds of surfaces commonly encountered in industrial laboratory and other equipment, such as, for example, valves, pipe joints, junctions of various kinds, fittings into vacuum and pressure chambers, evaporators, ovens, oven door seats, sight glass port seals, bolted or riveted seams, flanges, and the more regular elements such as pipes and chambers.

Still another object of the present invention is to provide such a leak detector which is so constructed as to enable the substantial minimization of gravity effects on the moving indicator of the system.

A further object thereof is the provision of a leak detector which will remain functional when in contact with both hot and cold surfaces.

The above and other objects are attained in the preferred basic form of the present invention which consists of a bell or cup so shaped as to form a closed chamber with the work surfaces to which it is to be applied, and having an exhaust port therefrom in connection with a transparent horizontally positionable tube containing an axial passage which may be open to the atmosphere at the free end and in communication with said port at the other end, and in which there is placed a prepared plug or thread of foam.

Other objects and a fuller understanding of the present invention may be had by referring to the following detailed description and claims, taken in conjunction with the accompanying drawings which illustrate preferred embodiments thereof, it being understood that the foregoing statement of the objects of the invention and the brief summary thereof is intended to generally explain the same without limiting it in any manner.

FIG. 1 is a side elevational view of a leak detector embodying the present invention, portions thereof being shown in section in order to more clearly disclose the features thereof.

FIG. 2 is an enlarged fragmentary sectional view taken along the lines 2—2 of FIG. 1.

FIG. 3 is an elevational view of another embodiment of the present invention, portions similarly being broken away to better show the construction thereof.

FIG. 4 is an elevational sectional view of another embodiment of the present invention.

FIG. 5 is an elevational view partially in section of still another embodiment of the present invention.

FIG. 6 is a view in perspective of one form of cup employed with the present invention.

FIG. 7 is a sectional view thereof taken along the lines 7—7 of FIG. 6.

FIG. 8 is a perspective view of another form of cup.

FIG. 9 is a sectional view thereof taken along the line 9—9 of FIG. 8.

FIG. 10 is a perspective view of still another form of cup.

FIG. 11 is a sectional view thereof taken along line 11—11 of FIG. 10.

FIG. 12 is a view in perspective of another form of cup.

FIG. 13 is a sectional view of still another form of cup used with the present invention.

Referring now to the drawings and particularly to the embodiment shown in FIGS. 1 and 2, the form of the present invention there illustrated comprises a bell or cup 10 preferably made of rubber or other resilient plastic, the lower circumference 11 of which makes a sealing connection with the work surface 12 in which a leak is suspected. Cup 10 has a shank portion 13 through which there is an axial passage. A bent glass indicator tube 14 is seated by its shorter arm within said passage, its longer arm extending horizontally. There is formed in tube 14 an axial passageway 15 in which a prepared foam thread or plug 16 is positioned. Axial passageway 15 is in communication with the atmosphere at the free end of the longer arm of tube 14. Graduations 17 may be marked along the side of tube 14.

In operation, if the device is placed over a work surface 12 in which a leak through a fissure 18 is taking place, if the system is a pressure system plug 16 of foam will travel through the free end of the longer arm of tube 14 (i.e. toward the right in FIG. 1) and conversely, if the system under test is a vacuum system plug 16 will travel toward cup 10 (i.e. toward the left in FIG. 1).

Another embodiment of the present invention is illustrated in FIG. 3 wherein the cup 19 consists of a metal housing 20 which may be rectangular or round or any other desired section, having an upwardly extending nipple 21 and terminating at its lower portion in a horizontally extending flange 22. Secured to the underside of flange 22 is a gasket 23 of matching configuration made of rubber or other resilient plastic material which is capable of making a sealing connection to a ferrous work surface 24. Magnets 25 are connected to flange 22 so as to extend downwardly thereof just short of the lower surface of gasket 23 when the same is in the uncompressed condition, so that as said magnets are attracted to the ferrous work surface 24, gasket 23 is compressed into sealing relationship therewith and cup 19 is firmly held in place by the magnetic engagement of the magnets with said work surface.

Attached to nipple 21 is a deformable tube 26 of stiff rubber or the like, the free end of which is connected to a glass indicator tube 27 similar to tube 14 of the above described embodiment, and likewise containing a plug 16 of foam in axial passageway 15 thereof, and bearing graduations 17. This embodiment, of course, operates in the same manner as does the previous embodiment.

Still another embodiment is illustrated in FIG. 4, wherein cup 28 is proposed to enclose a relatively small volume 29 between the lower surface of body 30 thereof and the gasket 31 which is affixed to said lower surface and which makes a sealing connection with work surface 12. Body 30 has an axially located bore 32 which is in connection at its lower end with volume 29 and at its upper end with a small chamber 33, the upper margins 34 of which bear concave surfaces which form a seat for a ball 35 which is at one end of and integral with a bent glass indicator tube 36, the ball 35 being maintained in its seat by a fitting 37. As in the case of the two previous embodiments, the indicator tube contains a central passageway 15 in which a foam plug 16 is positioned. Since tube 36 may be angularly displaced relative to body 30 by means of ball 35 moving in the socket formed by the inner surfaces of fitting 37 and the bearing surfaces of upper margins 34 of chamber 33, it is possible with this embodiment to position cup 28 along inclined surfaces and yet maintain tube 36 in a horizontal position.

Another method of enabling angular displacement of the indicator tube 36 is illustrated in FIG. 5 wherein cup 38 is similarly formed of body 39, gasket 40 and contains an axially located bore 41 in communication with the lower surface of body 39 at one end and a chamber 42 at the other end, the walls of the chamber being correspondingly threaded to match a threaded insert fitting 43 which bears a gooseneck 44, to the free end of which there is affixed a fitting 45 which threadingly engages the corresponding threads proximate an end of a tube 46, the other end of tube 46 being connected by a coupling 47 to a transparent tube 48 in which there is formed an axial passage or chamber 49 of larger diameter than the axial passage 50 of a transparent indicator tube 51 connected to the other end of tube 48 by means of a coupling 52. A terminal tube 53 is connected to the other end of indicator tube 51 by means of a coupling 54. Terminal tube 53 has an axial passage or chamber 55 which is larger in diameter than the passage 50 of tube 51.

Prepared foam plug 16 is placed within passage 50 of indicator tube 51 as in the previously described embodiments.

Aside from enabling the angular displacement of indicator tube 51 relative cup 38, to maintain the tube in a horizontal position, the embodiment of FIG. 5 illustrates the provision of chambers at either end of the indicator tube 51. These are furnished to enable the resolution of ambiguity in a system where either pressure or vacuum may exist. Should a vacuum exist, plug 16 will travel towards the left and then fall into chamber 49, whereas should there be pressure within the system tested plug 16 will drop into chamber 55.

The detector may also be employed to detect slight departures from atmospheric pressure in a closed system.

This form of the present invention may be left unattended and examined after plug 16 has dropped into either chamber 49 or chamber 55. Of course, once plug 16 of foam falls into the chamber, gas travels over the plug and the plug remains in the chamber.

In FIGS. 6 and 7 there is illustrated the embodiment which may be employed in connection with a particular shape of surface to be explored, as, for example, a flange-pipe connection. Here cup 56 includes an outer metal shell 57 and a resilient gasket 58 of rubber or other plastic material which is connected to said shell around the inside margins thereof. A nipple 59 extends from one portion of the shell and may be connected to the indicating tube system as shown in the above described embodiments. Such a cup, when placed over a pipe 60 and connecting flange 61, encloses a volume 62 which is checked for gas leakage, so long as gasket 58 maintains a sealing relationship with the confronting surfaces of said pipe and flange.

In FIGS. 8 and 9 a form particularly well adapted to check the seal adjacent to the point of entry of a pipe into a chamber is illustrated. There cup 63 includes a preferably rigid shell 64 in the form of a sectioned cylinder attached to a sectioned ring, along the margin of the inner surface of which is secured a resilient gasket 65. A nozzle 66 extends from shell 64 and may be brought into communication with an indicator system such as described in the embodiment shown in FIGS. 1 through 5. When cup 63 is brought to bear against a pipe 67 and a chamber wall 68, gasket 65 is caused to make sealing contact therewith and a hermetically sealed chamber 69 is formed between cup 63 and the work surfaces of said pipe and chamber wall, thus enabling the exploration thereof for leaks.

Where the pipe to be explored terminates in a doubly flanged connection, a cup 70 such as is illustrated in FIGS. 10 and 11 may be used, the same consisting of a doubly stepped, preferably rigid shell 71, along the inner margins of which there is secured resilient gasket 72. In such a cup, if placed against a pipe 73 and flanges 74 and 75, a chamber enclosing a volume 76 is formed and the surfaces within the hermetically sealed volume may be explored for leaks by means of an indicator tube and foam plug system connected to nipple 77 which is in communication with volume 76.

The form illustrated in FIG. 12 is included to demonstrate that a chamber may be formed between cup 78 and the walls of a work surface 79 which meet at an acute angle, cup 78 consisting of a shell 80 and marginally connected gasket 81 which, together with the work surface 79, encloses a hermetically sealed-off volume, a tube 82 in communication with said volume extending from said shell and being connectable to an indicator tube system.

The embodiment illustrated in FIG. 13 has been included to provide a means of exploring an area without permitting either the escaping gas to vent through the indicator tube (as for example, where a valve connected to the fumes of hydrogen fluoride or hydrofluoric acid is being checked) or to permit air to pass into the system. Here a cup 83, similar to the cup shown in FIG. 3, maintains within housing 20, by means of cross bars 84, a bellows 85 which may be placed over a nozzle 86 which extends from a work surface 87. Bellows 85 may be made of resilient material which in the rest state enclose a relatively small volume but which may easily be expanded by the pressure of gas escaping into the same and thus, by pressure transmitted to a plug 16 of foam positioned within an indicator tube system connected to nozzle 21, give rise to a visual indication of a leak through nozzle 86. Nozzle 86 might, for example, be attached to a valve under check.

Of course, many other forms of cups of like housings may be employed, including multiple cups which, when fastened together around an element such as a pipe or pipe-fitting connection enclose such connection and place within a thus single hermetically sealed-off volume, the entire joint between such pipe and fitting, one of such members containing an orifice connected to a nozzle which in turn may connect with an indicator tube system.

Similarly, cups in the shape of corners or triangular or other geometric forms or sections thereof may be employed in connection with specific work surfaces to be explored for leaks. A single indicator tube system may thus be employed with a variety of cups adapted to explore various surfaces.

The cup may be made of flexible or non-flexible material, a principal requirement being that the rim must be capable of forming a tight seal on the work surface to be tested, so that a hermetically tight enclosure may be formed. If necessary, such a rim can be treated with a tacky or sticky material to make it adhere and seal.

The smaller the free volume inside the cup and attached tubing the more quickly the device will respond to a leak. It has been found by experiment that a short (4–6 cm. in length) foam plug will start to move in a tube of 3 or 4 mm. inner diameter with a manometric pressure of 1 mm. water, corresponding to about one ten-thousandth of normal atmospheric pressure. A 2 mm. tube requires two to three times as much pressure, a 1 mm. tube 10 times as much. Consequently when a leak adds or removes this fraction of the air within the device the foam plug starts to move.

For example, if the free volume is 10 cm.$^3$ and the leak is at the rate of 1 cm.$^3$ of gas in 10 minutes, the pressure difference of $1/10,000$ of atmospheric pressure is reached in 0.6 second. For twice this pressure difference to be reached in the same time the free volume must be 5 cm.$^3$, and for 10 times this pressure difference the volume must be only 1 cm.$^3$. In each case the time required to start movement of the foam is inversely proportional to the magnitude of the leak, and directly proportional to the free volume.

To visually detect leaks satisfactorily the foam plug must not only start to move promptly but must continue to move at an easily visible rate. A satisfactory minimum rate is about 1 mm. in two seconds, although slower movement can be detected. The foam moves through the same volume as the volume of gas leak. Table I gives the magnitude of the leak necessary to give the above rate:

Table I

| Tube diameter, mm | 1 | 2 | 3 | 4 | 5 |
|---|---|---|---|---|---|
| Leak, cm.$^3$/minute | 0.024 | 0.094 | 0.21 | 0.38 | 0.59 |

Where the device may be left in place for a period of time then the rate of movement may be much slower and the expedient of terminal chambers on either side of the indicator tube, as illustrated in FIG. 5 may be employed.

A practical size for a circular cup is 4 cm. in diameter and an average of 0.3 cm. in depth for the inside cavity; the volume is then 3.8 cm.$^3$. Tubes of 3, 2, 1 mm. inner diameter and 25 cm. in length up to the foam plug add 1.8, 0.8 and 0.2 cm.$^3$ to the volume. A circular cup 2 cm. in diameter and 0.3 cm. deep has a volume of 0.96 cm.$^3$. An oblong flat cup 3 x 4 x 0.3 cm. has a volume of 1.8 cm.$^3$.

It is obvious that large cups and tubes can be used to detect larger leaks, while smaller leaks require small cups and detector tubes, with a corresponding increase in time and care on the part of the operator. According to the data given above, a leak of 0.024 cm.$^3$/minute, or 1 cm.$^3$ in about 40 minutes, can be detected quickly with a small cup and a 1 mm. indicator tube. It is probable that even smaller leaks can be detected with careful work in cases where it is important. Devices which are designed to clamp over an entire pipe fitting will ordinarily contain a large gas volume and it will take a longer time to establish sufficient pressure difference. This is not a disadvantage since the device is clamped in a stable position and does not have to be held in a fixed position by hand. Once the foam starts to move the sensitivity is determined by the detector tube diameter and not by the cup volume.

Most leaks of importance in industrial equipment are of much larger magnitude, e.g. from 1 cm.$^3$ per minute up. Smaller leaks than 0.05 cm.$^3$ per minute are normally of importance only in high vacuum equipment such as is used in vacuum evaporation of metals and in research equipment. A leak of 1 cm.$^3$ per hour will raise the pressure in a 100-liter chamber by 7.6 microns of mercury per hour; this kind of leak may be taken care of by continuous pumping.

The foam plug employed should be of a wet rather than dry type, so that it can slide along the detector tube without breakage of too many individual films, which might result in an air passage while the foam clings to the tube walls. The foam should, of course, last a reasonably long time without too much drainage or breaking up of bubbles, but this only means that it should remain fairly homogeneous for several minutes in the most commonly met cases.

Of course, in applications where slow leakage over a long period of time is to be detected, foams of greater durability should be employed.

The bubbles should be reasonably uniform in size with most of them no larger than the tube diameter. This assumes greater importance with a small bore detector tube. For example, a single bubble 2 mm. in diameter when drawn into a 1 mm. tube, occupies a length of 0.5 cm. In order to provide better visibility of the foam plug, a maximum number of bubbles of no greater diameter than 1 mm. is desirable. With 3- or 4-mm. tubes there is no problem. In general, foam should be easily formed with most bubbles not over 2 mm. in diameter, with a minimum of film breakage or bubble collapse over a period of at least 10 minutes, when exposed to air.

The selection of the preparation of foam may vary from application to application, depending in part, as above indicated, on the duration of foam integrity required as well as the "slipperiness" of the foam boundaries as regards the surfaces of the passage in the indicator tube along which the plug travels. A foam plug has been selected because it is about the lightest structure which can maintain its structural integrity over a sufficiently long length of time and yet give a clearly distinguishable visual indication of displacement with reference to the indicator tube.

Foams may most easily be manufactured by placing a suitable soap or detergent or other foaming agent in a container, usually in concentrations of 0.1 to 0.5%, and shaking the container. Of course, since foam is the colloidal system of gas displaced in liquid, it may be formed by whipping and beating or by injecting gas into, or causing it to pass rapidly through, a solution. Some foams may be formed by condensation. One suitable foam-forming material which may be easily shaken to produce a plug for the indicator tube system described above is a solution made from Nacconol, an alkyl aryl sodium sulfonate (Allied Chemical & Dye Corporation, National Aniline Division), processes for the manufacture of which are described in United States Patents Numbered 2,387,572, 2,393,526 and 2,397,133. The foam plug may be inserted in a passage by dipping the tube in the foam or by injecting the plug and the same may then be blown to a suitable position.

In lieu of the foam-forming material specified above there may be employed any of the hundreds of foam-forming surface-active materials which are universally available.

Although the present invention has been described with a certain degree of particularity, it is understood that the present disclosure has been made only by way of example and that numerous variations may be employed without transcending the scope of the invention as hereinafter claimed.

What is claimed is:

1. A detector of fluid leaks from a work surface comprising a cup having a deformable portion adapted to hermetically seal off a volume of fluid between said cup and a work surface, said cup having an opening formed in a wall thereof, an indicator tube connected to said cup and in communication with said opening and a discrete plug of foamed liquid positioned in said tube and containing a plurality of discrete bubbles of no larger diameter than the inside diameter of said tube.

2. A detector as described in claim 1 and means to angularly displace said tube relative to said cup.

3. A detector as described in claim 2, said means comprising a flexible tube connecting said indicator tube and said cup.

4. A detector as described in claim 2, said means comprising a gooseneck tube connecting said indicator tube and said cup.

5. A detector tube as described in claim 2, said means including a universal joint connecting said tube and cup.

6. A detector as described in claim 1, said work surface being the surface of a ferrous material and at least one magnet mounted to said cup to maintain the engagement of said cup and surface.

7. A detector as described in claim 1, the inside of said tube being enlarged in at least one portion to provide a reservoir.

8. A detector as described in claim 1, the inside of said tube being enlarged in at least two spaced portions to form reservoirs therein, said plug being initially positioned between said reservoirs.

9. A detector as described in claim 1 and a fluid-tight container within and connected to said cup, said container being deformable from a rest state and having an opening formed therein.

10. A detector of fluid leaks from a work surface comprising a cup including a housing and a deformable fluid-tight gasket secured to said housing about a portion thereof to enclose a hermetically sealed volume of fluid between said cup and a work surface when said gasket is pressed against said surface, said portion of said housing having an opening formed therein, an indicator tube, having at least one transparent part, angularly-displaceably mounted to said cup in communication with said opening in said housing and a discrete plug of foamed liquid positioned within said tube and containing a plurality of discrete bubbles of no larger diameter than the inside diameter of said tube.

11. A detector as described in claim 10 for use with a work surface of magnetic material and a magnet mounted to said housing and extending therefrom in the direction of said gasket but short of the bottom surface of said gasket to maintain the engagement of said gasket and a work surface to which said gasket has been pressed.

12. A detector as described in claim 10, and a reservoir member comprising a chamber of larger internal diameter than the internal diameter of said indicator tube connected to said indicator tube in communication therewith.

13. A detector as described in claim 10 for use with a work surface having a predetermined non-planar surface, the shape of the bottom of said cup being correspondingly non-planar to match the configuration of said surface.

14. A leak detector comprising a resilient cup having a concave bottom portion and a top, upwardly extending shank portion, said shank portion having a passage formed therethrough in communication with said concave bottom portion, a transparent indicator tube mounted in said passage and a discrete plug of foamed liquid positioned in said indicator tube and containing a plurality of discrete bubbles of no larger diameter than the inside diameter of said tube.

15. A leak detector as described in claim 14 said tube being L-shaped.

16. A leak detector comprising a housing having a bottom flanged portion, a resilient continuous gasket secured to the bottom of said flanged portion, said housing having an opening formed in a wall thereof, a flexible tube secured to said housing in communication with said opening, a rigid transparent indicator tube connected to and in communication with said flexible tube and a discrete plug of foamed liquid positioned in said indicator tube and containing a plurality of discrete bubbles of no larger diameter than the inside diameter of said tube.

17. A leak detector as described in claim 16 and at least one magnet secured to said flanged portion, the bottom of said magnet extending in the direction of the bottom of said gasket but falling short thereof, whereby when said detector is pressed against a ferrous surface said magnet retains said detector against said surface.

18. A leak detector comprising a housing, a resilient continuous gasket secured to the bottom of said housing and enclosing a portion of the bottom surface of said housing, said housing having formed in an upper portion thereof a chamber, and also having formed therein a passage between said chamber and said bottom surface enclosed by said gasket, a transparent indicator tube terminating in a ball portion, said housing having a ball seat formed in the upper surface thereof, said ball portion of said tube being journalled in said ball seat to form a universal joint therewith, said indicator tube being in communication with said chamber, and a plug of foamed liquid disposed within said indicator tube and containing a plurality of discrete bubbles of no larger diameter than the inside diameter of said tube.

19. A leak detector comprising a housing, a resilient continuous gasket secured to the bottom of said housing to enclose a bottom surface thereof, said housing having a passage therethrough running from said enclosed bottom surface to an upper surface thereof, a gooseneck connected at one end to said housing in communication with said passage, an indicator tube connected to the other end of said gooseneck and in communication therewith, and a plug of foamed liquid positioned within said indicator tube and containing a plurality of discrete bubbles of no larger diameter than the inside diameter of said tube.

20. A leak detector as described in claim 19, the inside of said indicator tube being enlarged in at least two spaced portions thereof to form reservoirs, said plug being initially positioned between said reservoirs.

21. A detector according to claim 1, wherein said cup includes a pair of longitudinally spaced first deformable portions lying in different plane and of curved configuration and longitudinally extending second deformable portions connecting the corresponding ends of said first deformable portions.

22. A detector according to claim 21, wherein said first deformable portions are of arcuate configuration of different radii of curvature and each of said second deformable portions includes longitudinally extending transversely offset end sections connected at their inner ends by a transversely extending section.

References Cited in the file of this patent
UNITED STATES PATENTS

| | | |
|---|---|---|
| 1,571,657 | Wilkinson | Feb. 2, 1926 |
| 2,738,669 | Silverman et al. | Mar. 20, 1956 |

FOREIGN PATENTS

| | | |
|---|---|---|
| 871,968 | Germany | Mar. 26, 1953 |